_United States Patent_ [19]

Fujimura et al.

[11] 3,867,437
[45] Feb. 18, 1975

[54] N-ACYL-N'-SUBSTITUTED-2,6-DIAMINO-BENZOIC ACIDS AND PROCESS FOR MAKING THE SAME

[75] Inventors: Hajime Fujimura, Kyoto; Kenju Suzuki; Osamu Asano, both of Kasugai; Masaru Asai, Aichi-gun, all of Japan

[73] Assignee: Sanwa Kagaku Kenkyusho Co. Ltd., Nogoya City, Japan

[22] Filed: May 20, 1971

[21] Appl. No.: 145,468

[30] Foreign Application Priority Data
June 9, 1970 Japan................................ 45-49666

[52] U.S. Cl... 260/518 R, 260/295.5 R, 260/518 A, 260/519, 424/266, 424/319
[51] Int. Cl.......................................... C07c 103/30
[58] Field of Search............ 260/518 A, 518 R, 519

[56] References Cited
UNITED STATES PATENTS
3,413,313   11/1968   Scherrer......................... 260/518 R Primary Examiner—Lorraine A. Weinberger
Assistant Examiner—L. A. Thaxton
Attorney, Agent, or Firm—Hammond & Littell

[57] ABSTRACT

N-acyl-N'-substituted-2,6-diaminobenzoic acid derivatives having the general formula:

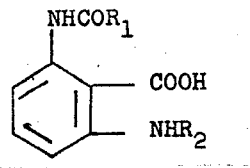

wherein $R_1$ is a lower alkyl, lower alkenyl, aralkyl, aralkenyl, phenoxyalkyl, phenyl unsubstituted or substituted with a halogen atom, hydroxy or lower alkoxy or aromatic radical having a nitrogen or oxygen atom in its cyclic ring, and $R_2$ is a lower alkyl, benzoyl or aromatic radical unsubstituted or substituted with a halogen atom, lower alkyl trifluoromethyl, hydroxy or lower alkoxy and a process for the preparation of the compounds. The N-acyl-N'-substituted-2,6-diaminobenzoic acid derivatives have excellent analgesic and antiphlogistic effects with relatively low side effects and/or toxicity.

14 Claims, No Drawings

N-ACYL-N'-SUBSTITUTED-2,6-DIAMINO-BENZOIC ACIDS AND PROCESS FOR MAKING THE SAME

BACKGROUND OF THE INVENTION

There have been proposed a variety of processes for the preparations of compounds having the general formula:

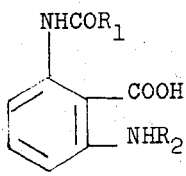

(1)

wherein $R_1$ is a lower alkyl, lower alkenyl, aralkyl, aralkenyl, phenoxyalkyl, phenyl unsubstituted or substituted with a halogen atom, hydroxy or lower alkoxy, or aromatic radical having a nitrogen or oxygen atom in its cyclic ring, and $R_2$ is a lower alkyl, benzoyl, or aromatic radical unsubstituted or substituted with a halogen atom, lower alkyl, trifluoromethyl, hydroxy or lower alkoxy and according to one of the prior art processes for the production of such compounds, a 6-nitro-N-$R_2$ substituted anthranilic acid is reduced and the thus obtained N-$R_2$ substituted 2,6-diaminobenzoic acid (in either case, $R_2$ is the same as defined hereinabove) is acylated thereby obtain to the compound having the above-mentioned general formula. However, the N-$R_2$ substituted 2,6-diaminobenzoic acid which is produced as the intermediate product in the prior art process is an unstable product and therefore, when the intermediate product is acylated the intermediate product is appreciably discolored due to its oxidization to the extent that the final product from the intermediate product cannot be easily refined. In addition, since the 6-nitro-N-$R_2$ substituted anthranilic acid employed as the starting material is expensive, the prior art process is not suitably carried out on a commercial basis.

SUMMARY OF THE INVENTION

Therefore, one purpose of the present invention is to provide a process for the preparation of 2,6-diaminobenzoic acid derivatives which can effectively eliminate the disadvantages inherent in the prior art process for the preparation of such acid derivatives and which can be practiced on a commercial base.

More particularly, the present invention is to provide a process for the preparation of a 2,6-diaminobenzoic acid derivative having the general fromula:

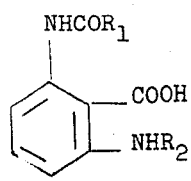

(1)

wherein $R_1$ is a lower alkyl, lower alkenyl, aralkyl, aralkenyl, phenoxyalkyl, phenyl unsubstituted or substituted with a halogen atom, hydroxy or lower alkoxy, or an aromatic radical having a nitrogen or oxygen atom in its cyclic ring, and the process comprises of reacting a 6-halogeno-N-acylanthranilic acid having the general formula:

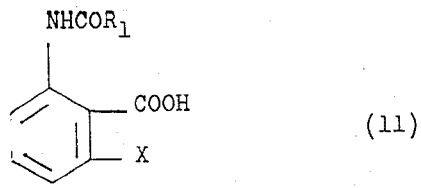

(II)

(wherein $R_1$ is the same as defined hereinabove and X is halogen atom) with an aromatic amine having the general formula:

$H_2N-R_2$ (III)

(wherein $R_2$ is the same as defined hereinabove) in the presence of an acid binding agent and a small amount of copper as the catalyst.

The 6-halogen-N-acylanthranilic acid which is one of the reactants employed in carrying out the process can be prepared with a high yield by oxidizing a 6-halogen-N-acyl-toluidine which can be easily derived from toluene with an oxidizing agent such as permanganate or alternatively by halogenating a N-acyl-2,6-diaminobenzoic acid in accordance with any suitable conventional procedure.

According to one aspect of the process according to the present invention, a 6-halogeno-N-acylanthranilic acid is reacted with one to two equivalents of an aromatic amine in the presence of a small amount of copper powder and about two equivalents of an acid binding agent at a temperature from 50° to 150° C for 1 to 3 hours. As the solvent suitably employed in carrying out the process of the invention, water, alcohol, N,N-dimethylformamide, dimethylsulfoxide, pryridine, dioxane, mixtures thereof, or any liquid which does not adversely affect upon the reaction is recommended. However, when the aromatic amine which is one of the reactants is in its liquid phase at the reaction temperature, the solvent may be substituted with an excess amount of the aromatic amine. When a 6-chloro-N-anthranilic acid is employed as the starting material from which the 6-halogeno-acylanthranilic acid is prepared, the copper powder to be employed as the catalyst should be an activated copper powder. In other cases, any suitable commercially available copper powder may be employed. As the acid binding agent suitably employed in the process of the invention, although any inorganic or organic base such as alkali metal hydroxide alkali metal carbonate or tri-ethylamine may be used, alkali metal carbonate is the most preferable of the above-mentioned bases. The compounds of the present invention having the general formula (1) referred to above have excellent analgesic and antiphlorgistic effects with relatively low side effects and/or toxicity.

For better understanding of the present invention, the invention will be now described referring to specific examples of the same which illustrate the invention, but not limit the scope of the same in any way.

EXAMPLE 1

A mixture of 5.5g of 6-iodo-N-benzoylanthranilic acid, 2.8 g of aniline, 0.1 g of copper powder, 2.8 g of potassium carbonate, 10 ml of N,N-dimethylformamide and 50 ml of water was placed into a reactor and the mixture was heated under agitation on a steam bath for 3 hours. The resultant reaction product was acidified with diluted hydrochloric acid and the thus formed deposit was then filtered being followed by water rinsing and recrystallization with ethylalcohol to obtain 4.0 g of yellowish N-benzoyl-N'-phenyl-2,6-diaminobenzoic acid with needle crystal (yield: 80% and melting point: 184°–185°C decomposition).

The infrared spectrum of the final product (in KBr) was determined as follows:
3455 cm$^{-1}$(NH), 1660 cm$^{-1}$(CO) and 1630 cm$^{-1}$(CO).

EXAMPLE 2

A mixture of 6.4 g of 6-bromo-N-benzoylanthranilic acid, 4.4 g of p-toluidine, 0.1 g of copper powder, 2.8 g of potassium carbonate and 15 ml of isoamylalcohol was placed into a reactor and the mixture was heated under agitation at 120°–130° for 2 hours. The obtained reaction product was subjected to steam distillation to distil out isoamylalcohol. The residue was acidified with hydrochloric acid and the formed deposit was filtered being followed by water rinsing and recrystallization with isopropylalcohol to obtain 5.4 g of yellowish N-benzoyl-N'-4'-methylphenyl-2,6-diaminobenzoic acid with needle crystal (yield: 77% and melting point: 171°C decomposition).

The infrared spectrum of the final product (in KBr) was determined as follows:
3450 cm$^{-1}$(NH), 1662 cm$^{-1}$(CO) and 1630 cm$^{-1}$(CO).

EXAMPLE 3

A mixture of 6.4 g of 6-bromo-N-benzoylanthranilic acid, 5.1 g of o-chloroaniline, 0.1 g of activated copper powder, 2.8 g of potassium carbonate and 30 ml of water was placed into a reactor and the mixture was heated on a steam bath for 3 hours. The obtained reaction product was acidified and the thus formed deposit was filtered being followed by water rinsing and recrystallization with ethylalcohol to obtain 4.3 g of yellowish N-benzoyl-N'-2'-chlorophenyl-2,6-diaminobenzoic acid with needle crystal (yield: 59% and melting point: 168°C decomposition).

The infrared spectrum of the final product (in KBr) was determined as follows:
3406 cm$^{-1}$(NH), 1690 cm$^{-1}$(CO) and 1658 cm$^{-1}$(CO).

EXAMPLE 4

A mixture of 6.0 g of 6-iodo-N-p-chlorobenzoylanthranilic acid, 1.7 g of aniline, 0.1 g of copper powder, 1.6 g of sodium carbonate and 50 ml of water was placed into a reactor and the mixture was heated under agitation on a steam bath for 2 hours. The obtained reaction product was acidified with hydrochloric acid and the thus formed deposit was filtered being followed by water rinsing and recrystallization with ethylalcohol to obtain 3.6 g of yellowish N-p-chlorobenzoyl-N'-phenyl-2,6-diaminobenzoic acid with needle crystal (yield: 66% and melting point: 187°C decomposition).

The infrared spectrum of the final product (in KBr) was determined as follows:
3370 cm$^{-1}$(NH), 1655 cm$^{-1}$(CO) and 1635 cm$^{-1}$(CO).

EXAMPLE 5

A mixture of 3.1 g of 6-chloro-n-p-chlorobenzoylanthranilic acid, 2.6 g of o-chloroaniline, 0.1 g of activated copper powder, 1.4 g of potassium carbonate and 15 ml of N,N-dimethylacetamide was placed into a reactor and the mixture was acidified with hydrochloric acid and the thus formed deposit was filtered being followed by water rinsing and recrystallization with ethylalcohol to obtain 2.4 g of yellowish N-p-chlorobenzoyl-N'-2'-chlorophenyl-2,6-diaminobenzoic acid with needle crystal (yield: 60% and melting point: 212°–213°C decomposition).

The infrared spectrum of the final product (in KBr) was determined as follows:
3484 cm$^{-1}$(NH), 1683 cm$^{-1}$(CO) and 1650 cm$^{-1}$(CO).

EXAMPLE 6

A mixture of 5.5 g of 6-chloro-N-benzoylanthranilic acid, 5.6 g of o-phenetidine, 0.1 g of activated copper powder, 3.0 g of potassium carbonate and 15 ml of N,N-dimethyformamide was placed into a reactor and the mixture was heated under agitation at 135°C for 2 hours and the obtained reaction product was acidified with diluted hydrochloric acid. The thus formed deposit was filtered being followed by water rinsing and recrystallization with ethylalcohol to obtain 4.2 g of yellowish N-benzoyl-N'-2'-ethoxyphenyl-2,6-diaminobenzoic acid with needle crystal (yield: 56% and melting point: 155°–156°C decomposition).

The infrared spectrum of the final product (in KBr) was determined as follows:
3425 cm$^{-1}$(NH), 1670 cm$^{-1}$(CO) and 1653 cm$^{-1}$(CO).

EXAMPLES 7 to 40

By repeating the procedure similar to those mentioned in connection with the processing Examples, the various compounds were prepared and they are shown in the following Table 1.

Table 1

| No. of Examples | 6-halogeno-N-acylanthranilic acids | | Aromatic amines | Acid binding agents | Products | |
|---|---|---|---|---|---|---|
| | $R_1$ | X | $R_2$ | | Nomenclatures of compounds | m.p. (°C) |
| 7 | -CH$_3$ | Br |  | Na$_2$CO$_3$ | N-acetyl-N'-phenyl-2,6-diaminobenzoic acid | 154 - 5 (decomposition) |

Table 1—Continued

| No. of Examples | 6-halogeno-N-acylanthranilic acids R₁ | X | Aromatic amines R₂ | Acid binding agents | Products Nomenclatures of compounds | m.p. (°C) |
|---|---|---|---|---|---|---|
| 8 | -CH₂CH₂CH₃ | Br |  | Na₂CO₃ | N-n-butyloyl-N'-phenyl-2,6-diaminobenzoic acid | 133 (") |
| 9 |  | Br | F  | K₂CO₃ | N-benzoyl-N'-2'-fluorophenyl-2,6-diaminobenzoic acid | 185 (") |
| 10 |  | Cl | CH₃  | K₂CO₃ | N-benzoyl-N'-3'-methylphenyl-2,6-diaminobenzoic acid | 174 - 175 |
| 11 |  Cl | Cl | CH₃  | K₂CO₃ | N-p-chlorobenzoyl-N'-3'-methylphenyl-2,6-diaminobenzoic acid | 174 - 175 (decomposition) |
| 12 |  | I | Cl  | | N-benzoyl-N'-3'-chlorophenyl-2,6-diaminobenzoic acid | 176 - 177 (") |
| 13 |  | Cl | OCH₃  | K₂CO₃ | N-benzoyl-N'-3'-methoxyphenyl-2,6-diaminobenzoic acid | 155 - 156 (") |
| 14 |  | Br | OCH₃  | K₂CO₃ | N-benzoyl-N'-2'-methoxyphenyl-2,6-diaminobenzoic acid | 155 (") |
| 15 |  | Cl | CH₃  | K₂CO₃ | N-benzoyl-N'-2'-methylphenyl-2,6-diaminobenzoic acid | 169 (") |
| 16 | Cl  | Cl | CH₃  | Na₂CO₃ | N-p-chlorobenzoyl-N'-2'-methylphenyl-2,6-diaminobenzoic acid | 168 (") |
| 17 |  Cl | Cl | Cl  | K₂CO₃ | N-p-chlorobenzoyl-N'-3'-chlorophenyl-2,6-diaminobenzoic acid | 185 (decomposition) |
| 18 | Cl  | Cl |  | Ca(OH)₂ | N-o-chlorobenzoyl-N'-phenyl-2,6-diaminobenzoic acid | 185 (") |
| 19 | -CH=CH- | Br |  | K₂CO₃ | N-cinnamoyl-N'-phenyl-2,6-diaminobenzoic acid | 129 - 130 (") |
| 20 | OCH₃ OCH₃ OCH₃  | Br |  | K₂CO₃ | N-3',4',5'-trimethoxybenzoyl-N'-phenyl-2,6-diaminobenzoic acid monohydrate | 150 (") |

Table 1 — Continued

| No. of Examples | 6-halogeno-N-acylanthranilic acids $R_1$ | X | Aromatic amines $R_2$ | Acid binding agents | Products Nomenclatures of compounds | m.p. (°C) |
|---|---|---|---|---|---|---|
| 21 | ―⌬―Cl | Cl | F―⌬ | $K_2CO_3$ | N-p-chlorobenzoyl-N'-2'-fluorophenyl-2,6-diaminobenzoic acid | 187 ( " ) |
| 22 | ―⌬―Cl | Cl | $OCH_3$―⌬ | $Ca(OH)_2$ | N-p-chlorobenzoyl-N'-2'-methoxyphenyl-2,6-diaminobenzoic acid | 187 ( " ) |
| 23 | ―⌬―F | Cl | ⌬ | $Na_2CO_3$ | N-p-fluorobenzoyl-N'-phenyl-2,6-diaminobenzoic acid | 187 ( " ) |
| 24 | ⌬ | I | $OC_2H_5$―⌬ | $Na_2CO_3$ | N-benzoyl-N'-3'-ethoxyphenyl-2,6-diaminobenzoic acid | 160 ( " ) |
| 25 | ―⌬―Cl | Cl | ⌬―F | $K_2CO_3$ | N-p-chlorobenzoyl-N'-3'-fluorophenyl-2,6-diaminobenzoic acid | 186 – 187 ( " ) |
| 26 | ⌬―Cl | Cl | ⌬ | $K_2CO_3$ | N-m-chlorobenzoyl-N'-phenyl-2,6-diaminobenzoic acid | 170 (decomposition) |
| 27 | ―⌬―Cl | Cl | $OCH_3$―⌬ | $Na_2CO_3$ | N-p-chlorobenzoyl-N'-3'-methoxyphenyl-2,6-diaminobenzoic acid | 160 ( " ) |
| 28 | ―⌬―Cl | Br | ⌬―$OCH_3$ | $K_2CO_3$ | N-p-chlorobenzoyl-N'-4'-methoxyphenyl-2,6-diaminobenzoic acid | 183–184 ( " ) |
| 29 | ⌬ | Br | ⌬―$CF_3$ | $K_2CO_3$ | N-benzoyl-N'-3'-trifluoromethylphenyl-2,6-diaminobenzoic acid | 167 ( " ) |
| 30 | ―⌬―Cl | Cl | ⌬―$CF_3$ | $K_2CO_3$ | N-p-chlorobenzoyl-N'-3'-trifluoromethylphenyl-2,6-diaminobenzoic acid | 172–173 ( " ) |
| 31 | ⌬N | Br | ⌬ | $K_2CO_3$ | N-nicotinoyl-N'-phenyl-2,6-diaminobenzoic acid | 217 ( " ) |
| 32 | $CH_3$-$CH$-$CH_2CH_3$ | Br | ⌬ | $K_2CO_3$ | N-isobutyloyl-N'-phenyl-2,6-diaminobenzoic acid | 133 ( " ) |
| 33 | ⌬O (furyl) | Br | ⌬ | $K_2CO_3$ | N-α-furoyl-N'-phenyl-2,6-diaminobenzoic acid | 191 ( " ) |

Table 1 — Continued

| No. of Examples | 6-halogeno-N-acylanthranilic acids R₁ | X | Aromatic amines R₂ | Acid binding agents | Products Nomenclatures of compounds | m.p. (°C) |
|---|---|---|---|---|---|---|
| 34 | ⟨phenyl⟩ | I | ⟨phenyl⟩-F | K₂CO₃ | N-benzoyl-N'-4'-fluorophenyl-2,6-diaminobenzoic acid | 184-185 ( " ) |
| 35 | ⟨phenyl⟩ | I | ⟨phenyl⟩-OCH₃ | K₂CO₃ | N-benzoyl-N'-4'-methoxyphenyl-2,6-diaminobenzoic acid | 157 (decomposition) |
| 36 | ⟨phenyl⟩ | Br | CH₃CH₃ ⟨phenyl⟩ | K₂CO₃ | N-benzoyl-N-2,6-dimethylphenyl-2,6-diaminobenzoic acid | 152-153 ( " ) |
| 37 | ⟨phenyl⟩ | Br | CH₃ ⟨phenyl⟩ CH₃ | K₂CO₃ | N-benzoyl-N'-2',6'-dimethylphenyl-2,6-diaminobenzoic acid | 161-162 ( " ) |
| 38 | -CH₂-O-⟨phenyl⟩ | Br | ⟨phenyl⟩ | K₂CO₃ | N-phenyoxyacetyl-N'-phenyl-2,6-diaminobenzoic acid | 196 ( " ) |
| 39 | ⟨phenyl⟩ | Cℓ | ⟨phenyl⟩ | K₂CO₃ | N-p-hydroxybenzoul-N'-phenyl-2,6-diaminobenzoic acid monohydrate | 200-201 ( " ) |
| 40 | ⟨phenyl⟩ | Cℓ | ⟨phenyl⟩-OH | K₂CO₃ | N-benzoyl-N'-4'-hydroxyphenyl-2,6-diaminobenzoic acid monohydrate | 170-171 ( " ) |

For determining the acute toxic and analgesic effects of the compounds of the present invention over those of the conventional comparative compounds, experiments were conducted on mice using typical compounds of the invention and several controls and the results of the experiments are shown in the following Table 2.

Table 2

Compositions of the Invention

| Structure | LD₅₀ mg/kg (95%, C.L.) | | p.o./i.p. | ED₅₀ mg/kg (95%, C.L.) Ac-OH Strethcing |
|---|---|---|---|---|
| | i.p. | p.o. | | |
| NH-CO-⟨phenyl⟩ / COOH / NH-CH₃ | 345(295-404) | 500(450-555) | 1.45 | 24.3(15.2-38.9) i.p. 100.0(80-125) p.o. |
| NH-CO-⟨phenyl⟩ / COOH / NH-CO-⟨phenyl⟩ | 303(259-354) | >1100 | - | 120.0(84-172) p.o. |

Table 2—Continued

Compositions of the invention

| Structure | | | | |
|---|---|---|---|---|
| NH-CO-C₆H₅ / COOH / NH-C₆H₅ | 400(357-460) | 810(682-1061) | 2.25 | 23.0(13.5-39.1) i.p.<br>64.0(56.6-72.3) p.o. |
| NH-CO-C₆H₄-Cl / COOH / NH-C₆H₅ | 300(278-324) | 550(482-624) | 1.83 | 15.6(10.1-24.2) i.p.<br>150 → 20% Peak p.o. |
| NH-CO-C₆H₅ / COOH / NH-C₆H₄-CH₃ | 318(281-360) | 560(523-599) | 1.76 | 17.4(12.2-24.5) i.p.<br>100 → 40% Peak p.o. |
| NH-CO-C₆H₄-Cl / COOH / NH-C₆H₄-CH₃ | 370(330-416) | 550(509-595) | 1.49 | 300 → 50% Peak p.o. |
| NH-CO-C₆H₅ / COOH / NH-C₆H₄-Cl | 280(259-302) | 470(425-507) | 1.68 | 150.0(112-201) p.o. |
| NH-CO-C₆H₅ / COOH / NH-C₆H₄-OCH₃ | 243(202-292) | 515(490-541) | 2.12 | 19.5(14.9-25.6) i.p.<br>150 → 20% Peak p.p. |
| NH-CO-CH₂CH₂CH₃ / COOH / NH-C₆H₅ | 297(244-362) | >600 | - | 34.0(17.9-64.6) i.p.<br>200 → 60% Peak p.o. |
| NH-CO-C₆H₅ / COOH / NH-C₆H₄-OCH₃ | 223(199-250) | 550(522-580) | 2.47 | 28.5(17.2-47.3) i.p.<br>100 → 20% Peak p.o. |
| NH-CO-C₆H₅ / COOH / NH-C₆H₄-CH₃ | 236(202-276) | 474(388-578) | 2.01 | 13.2(10.9-16.0) i.p.<br>50 → 20% Peak p.o. |
| NH-CO-C₆H₄-Cl / COOH / NH-C₆H₄-CH₃ | 204(173-241) | 334(278-401) | 1.64 | 26.0(16.0-42.4) i.p.<br>180 → 40% Peak p.o. |
| NH-CO-C₆H₅ / COOH / NH-C₆H₄-F | 263(231-300) | 490(438-548) | 1.86 | 25.0(19.2-32.5) i.p.<br>100 → 40% Peak p.o. |
| NH-CO-C₆H₄-Cl / COOH / NH-C₆H₅ | 326(299-355) | 630(600-662) | 1.93 | 26.4(19.4-35.9) i.p.<br>100 → 40% Peak p.o. |
| NH-CO-CH=CH-C₆H₅ / COOH / NH-C₆H₅ | 210(188-235) | 488(417-570) | 2.32 | 24.0(13.7-42.0) i.p.<br>200 → 30% Peak p.o. |

Table 2 — Continued

Compositions of the Invention

| Structure | | | | |
|---|---|---|---|---|
| NH-CO-C₆H₅ / COOH / NH-C₆H₄-Cl | 178(141-224) | 376(322-440) | 2.11 | 125.0(99-175) i.p. |
| NH-CO-C₆H₅ / COOH / NH-C₆H₄-F | 242(218-268) | 510(408-647) | 2.11 | 19.6(13.2-29.2)i.p. 100→20% Peak p.o. |
| NH-CO-CH₂-CHCH₃ / COOH / NH-C₆H₅ | 253(224-286) | 555(505-610) | 2.19 | 33.8(23.3-49.0)i.p. 150→10% Peak p.o. |
| NH-CO-C₆H₂(OCH₃)₃ / COOH / NH-C₆H₅ · H₂O | 350(284-417) | 640(615-660) | 1.83 | 144.0(120-173) p.o. |
| NH-CO-C₆H₄-Cl / COOH / NH-C₆H₄-F | 222(198-249) | 340(312-471) | 1.53 | 300→50%Peak p.o. |
| NH-CO-C₆H₄-F / COOH / NH-C₆H₅ | 268(233-320) | 540(509-572) | 2.01 | 300→40% Peak p.o. |
| NH-CO-C₆H₅ / COOH-OC₂H₅ / NH-C₆H₅ | 310(265-360) | 750(728-773) | 2.42 | 180.0(126-258) p.o. |
| NH-CO-C₆H₅ / COOH / NH-C₆H₄-CH₃ | 268(238-302) | 550(500-605) | 2.05 | 300→60% Peak p.o. |
| NH-CO-C₆H₄-Cl / COOH / NH-C₆H₄-F | 297(260-339) | 366(325-439) | 1.23 | 180.0(126-258) p.o. |
| NH-CO-C₆H₄-Cl / COOH / NH-C₆H₅ | 222(198-249) | 425(401-451) | 1.91 | 100→60% Peak p.o. |
| NH-CO-C₆H₄-Cl / COOH / NH-C₆H₄-OCH₃ | 271(244-301) | 650(596-708) | 2.40 | 200→50% Peak p.o. |
| NH-CO-C₆H₄-Cl / COOH / NH-C₆H₄-OCH₃ | 380(358-403) | 820(701-960) | 2.16 | 200→50% Peak p.o. |

Table 2—Continued

Compositions of the Invention

| Structure | Col 2 | Col 3 | Col 4 | Col 5 |
|---|---|---|---|---|
| NH-CO-C6H4-CF3 / COOH / NH-C6H5 | 225(201-252) | 750(663-847) | 3.33 | 200 → 65% Peak p.o. |
| NH-CO-C6H4-Cl / COOH / NH-C6H4-CF3 | 234(224-245) | 620(588-654) | 2.65 | 200 → 50% Peak p.o. |
| NH-CO-pyridyl / COOH / NH-C6H5 | >1000 | >1000 | – | 200 → 45% Peak p.o. |
| NH-CO-CH(CH3)2 / COOH / NH-C6H5 | 280(257-306) | 560(518-605) | 2.00 | 132(100-173)  p.o. |
| NH-CO-cyclopropyl / COOH / NH-C6H5 | 247(218-279) | 535(480-594) | 2.17 | 200 → 40% Peak p.o. |
| NH-CO-C6H5 / COOH / NH-C6H4-F | 277(256-299) | 560(536-585) | 2.02 | 200 → 40% Peak p.o. |
| NH-CO-C6H4-Cl / COOH / NH-C6H4-F | 398(356-446) | 623(596-651) | 1.57 | 200 → 50% Peak p.o. |
| NH-CO-C6H4-Cl / COOH-Cl / NH-C6H5 | 325(285-370) | 620(582-660) | 1.91 | 200 → 40% Peak p.o. |
| NH-CO-C6H5 / COOH / NH-C6H4-OCH3 | 235(216-256) | 623(596-651) | 2.65 | 200 → 40% Peak p.o. |
| NH-CO-C6H5 / COOH / NH-C6H3(CH3)2 | 248(220-280) | 720(692-749) | 2.90 | 200 → 30% Peak p.o. |
| NH-CO-CH3 / COOH / NH-C6H5 | 384(337-438) | 700(603-813) | 1.82 | 200 → 40% Peak p.o. |
| NH-CO-CH2-O-C6H5 / COOH / NH-C6H5 | 460(422-503) | >1000 | – | 200 → 50% Peak p.o. |
| NH-CO-C6H5 / COOH / NH-C6H4-OC2H5 | 262(230-299) | 442(389-504) | 1.69 | 200 → 30% Peak p.o. |

TABLE 2—Continued

Controls

| Structure | | | | |
|---|---|---|---|---|
| NH-CO-Ph, COOCH₃, NH-Ph | >1000 | >1000 | — | 300→ 45% Peak p.o. |
| Benzydamine | 141(140-142) | 557(507-613) | 3.95 | 22.0(18.3-26.4)i.p. |
| COOH, CH₃, CH₃, NH-Ph | 441(387-503) | 1160(1018-1323) | 2.63 | 22.0(18.3-26.4)i.p. 147.0(107-203) p.o. |
| COOH, NH-Ph-CF₃ | 275(250-323) | 950(654-1380) | 3.45 | 50.0(26.9-93.0)i.p. 140.0(98.7-200)p.o. |
| COOH, CH₂CH₃, NH-Ph | 441(387-503) | 1160(1018-1323) | 2.63 | 22.0(18.3-26.4)i.p. 147.0(107-203) p.o. |
| COOH, NH-Ph-CF₃ | 275(250-323) | 950(654-1380) | 3.45 | 50.0(26.9-93.0)i.p. 140.0(98.7-200)p.o. |

While there have been described what are at present considered to be the preferred examples of this invention, it will be obvious to those skilled in the art that various changes and modifications may be made therein without departing from the invention, and it is aimed, therefore, in the appended claims to cover all such changes and modifications as fall within the true spirit and scope of the invention.

what is claimed is:

1. An N-acyl-N'-substituted-2,6-diamino-benzoic acid having the formula

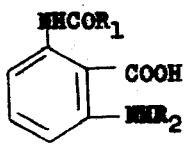

wherein $R_1$ is a member selected from the group consisting of lower alkyl, lower alkenyl, vinylbenzene, phenoxy-lower-alkyl, phenyl, halophenyl and lower alkoxyphenyl, and $R_2$ is a member selected from the group consisting of lower alkyl, benzoyl, phenyl and phenyl substituted with halogen, lower alkyl, trifluoromethyl, hydroxy and lower alkoxy.

2. The compound as set forth in claim 1, in which $R_1$ is phenyl, and $R_2$ is phenyl.

3. The compound as set forth in claim 1, in which $R_1$ is halophenyl and $R_2$ is phenyl substituted with halogen.

4. The compound as set forth in claim 1, in which $R_1$ is lower alkoxyphenyl and $R_2$ is phenyl substituted with lower alkoxy.

5. The compound of claim 1 wherein $R_1$ is phenyl and $R_2$ is 4-methylphenyl.

6. The compound of claim 1 wherein $R_1$ is phenyl and $R_2$ is 2-chlorophenyl.

7. The compound of claim 1 wherein $R_1$ is p-chlorophenyl and $R_2$ is phenyl.

8. The compound of claim 1 wherein $R_1$ is p-chlorophenyl and $R_2$ is 2-chlorophenyl.

9. A process for the preparation of an N-acyl-N'-substituted-2,6-diaminobenzoic acid having the formula:

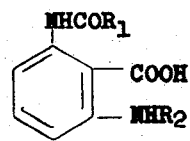

wherein $R_1$ is a member selected from the group consisting of lower alkyl, lower alkenyl, vinylbenzene, phenoxy-lower-alkyl, phenyl, and $R_2$ is a member selected from the group consisting of lower alkyl, benzoyl, phenyl and phenyl substituted with halogen, lower alkyl, trifluoromethyl, hydroxy and lower alkoxy, which comprises reacting one equivalent of a 6-halogen-N-acyl-anthranilic acid having the formula:

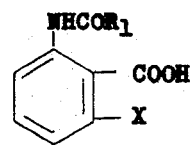

wherein $R_1$ is defined above and X is a halogen, with one to two equivalents of an amine having the formula:

$$H_2N - R_2$$

wherein $R_2$ is defined above, at a temperature from 50° to 150°C for one to three hours and in the presence of an acid binding agent, a small amount of copper as a catalyst, and an inert solvent.

10. The process as set forth in claim 9, in which said solvent is a member selected from the group consisting of water, ethyl alcohol, N,N-dimethylformamide, dimethylsulfoxide, pyridine dioxide and mixtures thereof.

11. The process as set forth in claim 9, in which said amine is employed in an excess amount when said amine is in a liquid phase at said reaction temperature.

12. The process as set forth in claim 9, in which an activated copper is employed as said catalyst when a 6-chloro-N-acylanthranilic acid is employed as one of said reactants.

13. The process as set forth in claim 9, in which said acid binding agent is selected from the group consisting of alkali metal hydroxide, alkali metal carbonate and triethylamine.

14. The process of claim 9 wherein $R_1$ and $R_2$ are phenyl.

* * * * *